US012601821B2

(12) United States Patent
Shileen et al.

(10) Patent No.: US 12,601,821 B2
(45) Date of Patent: Apr. 14, 2026

(54) HELMET DETECTION OF A MOTORCYCLE DRIVER

(71) Applicant: CONTINENTAL AUTOMOTIVE TECHNOLOGIES GMBH, Hannover (DE)

(72) Inventors: Vinaykumar Shileen, Bangalore (IN); Sudeep Kumar Gaurkar, Bangalore (IN); Praveen Srinivasa, Karnataka (IN); Kishan Vinjamuri, Pithapuram (IN); Nithin Y P, Mysore (IN)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 70 days.

(21) Appl. No.: 18/692,992

(22) PCT Filed: Sep. 21, 2022

(86) PCT No.: PCT/EP2022/076264
§ 371 (c)(1),
(2) Date: Mar. 18, 2024

(87) PCT Pub. No.: WO2023/046773
PCT Pub. Date: Mar. 30, 2023

(65) Prior Publication Data
US 2024/0385304 A1     Nov. 21, 2024

(30) Foreign Application Priority Data

Sep. 21, 2021     (IN) .............................. 202131042713

(51) Int. Cl.
*G01S 7/539*          (2006.01)
*B60K 28/02*          (2006.01)
(Continued)

(52) U.S. Cl.
CPC .............. *G01S 7/539* (2013.01); *B60K 28/02* (2013.01); *G01S 7/52004* (2013.01);
(Continued)

(58) Field of Classification Search
CPC ...... G01S 7/539; G01S 7/52004; G01S 7/526; B60K 28/02
See application file for complete search history.

(56) References Cited

U.S. PATENT DOCUMENTS

| 6,608,908 B1 | 8/2003 | Galet et al. | |
| 10,959,479 B1 * | 3/2021 | Babu ........................ | B62J 27/00 |

(Continued)

FOREIGN PATENT DOCUMENTS

| CN | 106295551 A | 1/2017 |
| CN | 209883163 U | 1/2020 |

(Continued)

OTHER PUBLICATIONS

International Search Report (PCT/ISA/210) and Written Opinion (PCT/ISA/237) mailed on Jan. 25, 2023 by the European Patent Office as the International Searching Authority for International Application No. PCT/EP2022/076264. (11 pages).

(Continued)

*Primary Examiner* — Jess Whittington
*Assistant Examiner* — Jason T Nguyen
(74) *Attorney, Agent, or Firm* — Buchanan Ingersoll & Rooney P.C

(57) ABSTRACT

A sensor system for a single-track vehicle, including at least one sensor element positioned for detecting the surface of a driver's head and/or face of that vehicle, an electronic control unit to process the data of the sensor element and to calculate and/or decide, if the driver is wearing a helmet.

(Continued)

The electronic control unit is connected to at least one vehicle system, which is controlled by the electronic control unit.

14 Claims, 4 Drawing Sheets

(51) Int. Cl.

| | | |
|---|---|---|
| *B62J 50/21* | (2020.01) | |
| *G01S 7/52* | (2006.01) | |
| *G01S 7/526* | (2006.01) | |
| *G01S 15/88* | (2006.01) | |

(52) U.S. Cl.
CPC .............. *G01S 7/526* (2013.01); *G01S 15/88* (2013.01); *B62J 50/21* (2020.02)

(56) References Cited

U.S. PATENT DOCUMENTS

| | | | |
|---|---|---|---|
| 2009/0002161 A1 | 1/2009 | Luciani | |
| 2011/0037638 A1 | 2/2011 | Chen et al. | |
| 2014/0140552 A1* | 5/2014 | Hui | G08G 1/0965 |
| | | | 381/309 |
| 2014/0266752 A1 | 9/2014 | John | |
| 2015/0305426 A1 | 10/2015 | Lee et al. | |
| 2016/0073722 A1 | 3/2016 | Eustace | |
| 2017/0132907 A1 | 5/2017 | Lee et al. | |
| 2018/0287648 A1 | 10/2018 | Auerbach | |

FOREIGN PATENT DOCUMENTS

| | | | | |
|---|---|---|---|---|
| FR | 2747987 A1 | 10/1997 | | |
| JP | 2005179795 A | 7/2005 | | |
| JP | 2009180124 A | 8/2009 | | |
| WO | WO-8902560 A1 * | 3/1989 | .............. | F16P 3/147 |
| WO | WO-9728710 A1 * | 8/1997 | .............. | B62J 27/00 |
| WO | 2018154405 A1 | 8/2018 | | |

OTHER PUBLICATIONS

Office Action with English translation dated Sep. 9, 2023 issued by Government of India, Intellectual Property India in corresponding India Application No. 202131042713. (6 pages).

Hearing Notice issued Jul. 2, 2025, by the Patent Office, Government of India, in corresponding India Patent Application No. 202131042713 with an English Translation of the Hearing Notice. (3 pages).

Office Action (Communication pursuant to Article 94(3) EPC) issued Nov. 11, 2025, by the European Patent Office in corresponding European Patent Application No. 22 797 281.7-1015. (5 pages).

* cited by examiner

| P1 | P2 | P3 |
|----|----|----|
| P4 | Sensor | P6 |
| P7 | P8 | P9 |

Fig. 2

HELMET DETECTION OF A MOTORCYCLE DRIVER

CROSS REFERENCE TO RELATED APPLICATIONS

This application is the U.S. National Phase Application of PCT International Application No. PCT/EP2022/076264, filed Sep. 21, 2022, which claims priority to India Patent Application No. 202131042713, filed Sep. 21, 2021, the contents of such applications being incorporated by reference herein.

FIELD OF THE INVENTION

The item of this invention is a sensor system to detect, if a driver of a single-track vehicle is wearing a helmet and a method to detect such helmet.

SUMMARY OF THE INVENTION

An aspect of the invention is a sensor system and a method to improve the safety for a driver of a single-track vehicle and/or provide safety for a driver of a single-track vehicle in a robust/reliable and/or cost efficient way.

Preferably the sensor system is designed for a single-track vehicle, comprising at least one sensor element positioned for detecting the surface of a driver's head and/or face and/or detecting the driver's head or face of that vehicle, comprising an electronic control unit to process the data of the sensor element and to calculate and/or decide, if the driver is wearing a helmet, wherein the electronic control unit is connected to at least one vehicle system, which is controlled by the electronic control unit.

The vehicle system is for example the ignition or a warning lamp or a display designed to provide a visual warning or a device/acoustic actuator to provide an acoustic warning or two or more of these systems/devices.

It is appropriate, that the at least one sensor element is an ultrasonic sensor element. Particularly the sensor system comprises at least two ultrasonic sensor elements and/or an array of ultrasonic sensor elements.

With the surface of a driver's head or face is meant particularly the area/surface and/or area of the driver's head or face, preferably the surface directing in the forward direction of the vehicle and/or the area/surface, where the face of the driver is arranged/located, when looking in the forward direction of the vehicle.

A single-track vehicle is preferably a motor bike or a motor scooter.

Preferably the at least one sensor element or the at least two of the sensor elements are positioned and/or aligned and/or placed at or on or beside the instrument cluster, wherein the detection direction of that/these sensor elements is directing towards the area of the driver's head and/or face. Alternatively preferred the at least one sensor element is positioned/placed on the handle/handle bar or on the surface of the headlight in direction to the driver. It is appropriate, that the at least one sensor element is positioned and aligned in range to the driver/driver's position and within the operation range of the sensor element.

It is preferred, that the at least one sensor element is mounted in the way, that the direction of detection of the sensor element can be changed by moving the sensor element with regard to its sensitive direction. Particularly the at least one sensor element is laterally fixed, but moveable with regard to its detection direction and/or angle of detection, preferably by an electric motor, controlled by the electronic control unit. With this changeable direction of detection, the sensor element is able to detect different areas/zones, particularly in the outer field/periphery of the driver's head/face.

The electronic control unit is particularly designed to provide a control and/or actuation to disable the ignition of the vehicle, as a vehicle system, and/or to provide an acoustic and/or visual warning to the driver and/or limiting the speed of the vehicle, if the electronic control unit decides, that the driver is not wearing a helmet. Preferably the vehicle speed is controlled by the motor control system, for example an injection/throttle control system, in particular the electronic control unit and/or the motor control system sets a maximum speed, which is a limiting speed, in case it is decided, that the driver is not wearing a helmet.

The electronic control unit is preferably designed to calculate a reflection coefficient of the sensor signal, as a first criterion, of the at least one ultrasonic sensor element to decide, if the driver is wearing a helmet, wherein the reflection coefficient is calculated dependent on the quotient of the acoustic impedance of the driver's head/face surface and the acoustic impedance of the medium of the transmission environment.

The sensor system is preferably constructed that way, wherein the electronic control unit is designed to calculate a reflection coefficient R, as a first criterion for the decision, if the driver is wearing a helmet, according to or dependent on the following equation $$R = ((Z_2 - Z_1)/(Z_2 + Z_1))^2,$$

wherein $Z_1$ is the acoustic impedance of the medium of the transmission environment and $Z_2$ is the acoustic impedance of the driver's head/face surface, wherein particularly the reflection coefficient R is calculated dependent on the quotient of the acoustic impedance of the driver's head/face surface and the acoustic impedance of the medium of the transmission environment wherein a helmet is detected, if the unit reflection coefficient R is in the range from 0.93 to 1.5, and if reflection coefficient R if smaller than 0.93 or greater than 1.5, the driver is wearing no helmet. This coefficient is dependent on the range between the sensor element and the face and/or head of the driver.

In particular, the difference between the amplitude of the transmitted and received pulse of the ultrasonic sensor element or the respective amplitude of echo pulse alone will be different for helmet and skin, wherein (Amplitude Transmitted pulse−Amplitude Received pulse)$_{Helmet}$>(Amplitude Transmitted pulse−Amplitude Received pulse)$_{Skin}$ or Amplitude$_{ECHO\ Helmet}$>Amplitude$_{ECHO\ Skin}$ It is appropriate, that the sensor system comprises an array or sensor elements, particularly ultrasonic sensor elements, which emit a signal/ultrasonic signal/ultrasonic pulse. Preferred once the echo pulse is received by the sensor elements of the array, the sensor signal as output signal of each sensor element is sent for an amplitude measurement in the electronic control unit and a calculation of the time of flight, TOF, of the pulse/emitted signal. In the electronic control unit, a TOF and an Amplitude matrix will be generated which will preferably processed afterwards. These matrices are exemplarily shown in the following for a four sensor element array:

$$\begin{bmatrix} TOF1 & TOF2 \\ TOF3 & TOF4 \end{bmatrix} \text{ and } \begin{bmatrix} Amp1 & Amp2 \\ Amp3 & Amp4 \end{bmatrix}$$

After generating the matrices preferably the electronic control units can perform any matrix operations to generate a unique matrix, which includes both the TOF and Amplitude data in some mathematical relationship. For example: The multiplication of TOF and Amplitude matrix will generate a unique matrix for Helmet and Face, similarly matrix addition, matrix subtraction or any other operation can be performed.

The TOF matrix gives us preferably the information on how the object is the shape of the object. Thereby when matrix operations with TOF matrix with respect to amplitude matrix are performed, the result obtained will preferably provide the insight/information of both shape and type of material used, hence is used to differentiate/decide between helmet and face or if the driver is wearing a helmet.

It is appropriate, that the method for detecting a helmet of a driver of a single-track vehicle, is particularly using the sensor system, wherein after the steering lock of the vehicle is unlocked and/or the ignition is activated, at least one sensor element detects the surface of the driver's head or face, wherein the electronic control unit afterwards processes the data of the sensor element and decides, if the driver is wearing a helmet, wherein if the driver is wearing no helmet, the ignition will get disabled or not enabled and/or an acoustic and/or visual warning will be provided to the driver.

Preferably the method of detecting, if the driver is wearing a helmet is continuously or repeated after a defined time interval, as long as the ignition of the vehicle is active.

Preferably the at least one sensor element is an ultrasonic sensor element and the sensor element performs a beam sweep of ultrasonic pulses, particularly controlled by the electronic control unit, towards the driver's head/face, wherein the echo if these ultrasonic pulses is received by the sensor element and the sensor element provide the data to the electronic control unit.

It is appropriate, that the electronic control unit uses amplitude detection to detect with the sensor element, if the driver is wearing a helmet.

The electronic control unit uses preferably frequency analysis of the data of the sensor element, to decide, if a helmet is detected.

It is appropriate, that the electronic control unit calculates a reflection coefficient, as a first criterion, of the sensor signal of the at least one ultrasonic sensor element to decide, if the driver is wearing a helmet, wherein the reflection coefficient R is calculated dependent on the quotient of the acoustic impedance of the driver's head or face surface and the acoustic impedance of the medium of the transmission environment wherein a helmet is particularly detected, if the unit reflection coefficient R is in the range from 0.93 to 1.5, and if reflection coefficient R if smaller than 0.93 or greater than 1.5, the driver is wearing no helmet.

The electronic control unit preferably calculates a validation parameter, as a second criterion for the decision, if the driver is wearing a helmet, wherein the validation parameter is calculated dependent on the multiplication of the time of flight, TOF, and the amplitude of the sensor signal, wherein the TOP is particularly calculated from the moment of emitting, preferably an ultrasonic wave, until the moment of receiving the reflection signal/reflected ultrasonic wave. In case the validation parameter has a value of a defined range or outside, the electronic control unit decides, that the driver is wearing a helmet. If the sensor system comprises multiple sensor element, the multiplication of TOF and amplitude is for example a matrix calculation of the TOF matrix, where each sensor has one matrix parameter/value and the amplitude matrix, where each sensor provides one matrix parameter/value.

It is preferred, that the electronic control unit calculates to decide, if the driver wears a helmet, wherein the first criterion is used as a necessary criterion and the second criterion is used as a sufficient criterion. If both criteria are fulfilled, that the driver wears a helmet, the electronic control unit decides, that this is true.

The electronic control unit is in particular calculating a mapping of detection of the sensor element done dependent on the time of flight, TOF, and the amplitude of the reflection, especially dependent on the multiplication of TOF and amplitude. The mapping allows the electronic control unit to calculate the position and detection direction of the sensor element, where in a totally fixed and not adjustable sensor element can have only a single detection area and a sensor element, which detection direction is adjustable can have different detection areas/detection directions, wherein the current detection area/detection direction can be calculated dependent on the current multiplication of TOF and amplitude of that sensor element.

The electronic control unit performs preferably a self-diagnosis of the at least one sensor system before calculation and/or deciding if the driver is wearing a helmet. The self-diagnosis comprises particularly a check, if the sensor element is blocked in detection direction and/or if the sensor element is covered/reduced in functionality by dust/mud/snow/dirt.

It is preferred, that the electronic control unit performs a calibration after the self-diagnosis of the at least one sensor system and before the calculation and/or deciding if the driver is wearing a helmet. The calibration of the at least one sensor element comprises particularly a beam sweep, a receive of the echo signals and the sensor signal processing in the electronic control unit and is preferably calculation parameters for the helmet detection calculation/decision, particularly with respect to the reflection coefficient and/or the acoustic impedance of the medium of the transmission environment.

The at least one ultrasonic sensor element is in particular designed and positioned to emit an ultrasonic wave in the direction of a driver's head/face and receiving the reflected wave.

After the decision, that the driver is not wearing a helmet, the electronic control unit is in particular collecting data or the sensor system and/or data about the result of that decision and/or data analytics about the sensor system and preferably of the decisions made and respective results, if the driver is wearing a helmet.

It is preferred, that the electronic control unit is setting a speed limit for the vehicle after activating it and/or for this turn after activation of the vehicle and if the decision was executed, that the driver is not wearing a helmet, wherein in particular a speed limit or controlling the speed is executed by access and controlling of the electronic control unit to an engine/motor control unit and/or to a braking control unit and/or warning by visual and/or acoustic effects.

Preferably the mounting of the at least one sensor element is designed and embodied as snap fit or screw assembly.

As a helmet, particularly every kind of helmet is understood, with our without visor, closed or open, like a hard hat.

BRIEF DESCRIPTION OF THE DRAWINGS

FIGS. 1 to 4 show schematic examples of the sensor system, its use and the method.

DETAILED DESCRIPTION OF THE PREFERRED EMBODIMENTS

Figure 1A:
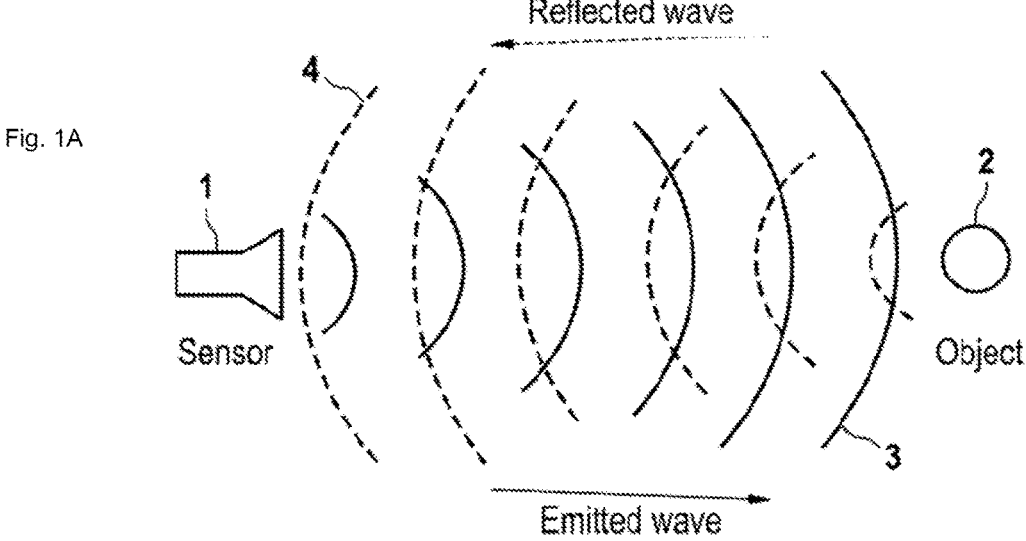

FIG. 1A discloses the function of an ultrasonic sensor element 1 as an example, wherein the ultrasonic sensor element 1 emits a wave 3 towards an object 2 and receives the reflected wave 4.

Figure 1B:
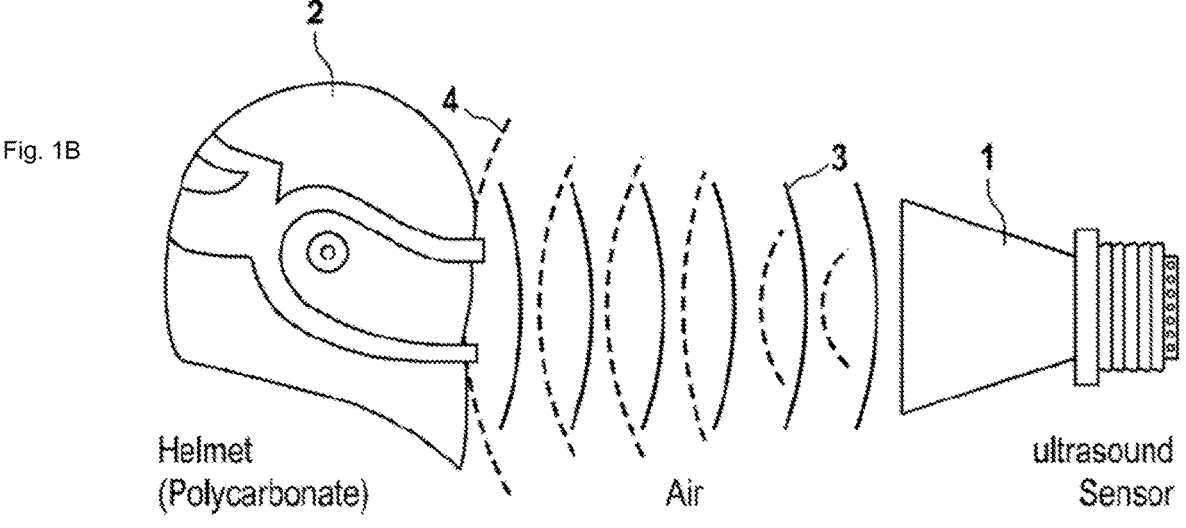

FIG. 1B shows an example, wherein the object 2 to detect is a helmet made of plastic, in particular of polycarbonate. The Ultrasonic sensor element 1 emits an ultrasonic wave 3 towards an object 2 and receives the reflected wave 4, wherein the medium of the transmission environment is air.

Figure 2:
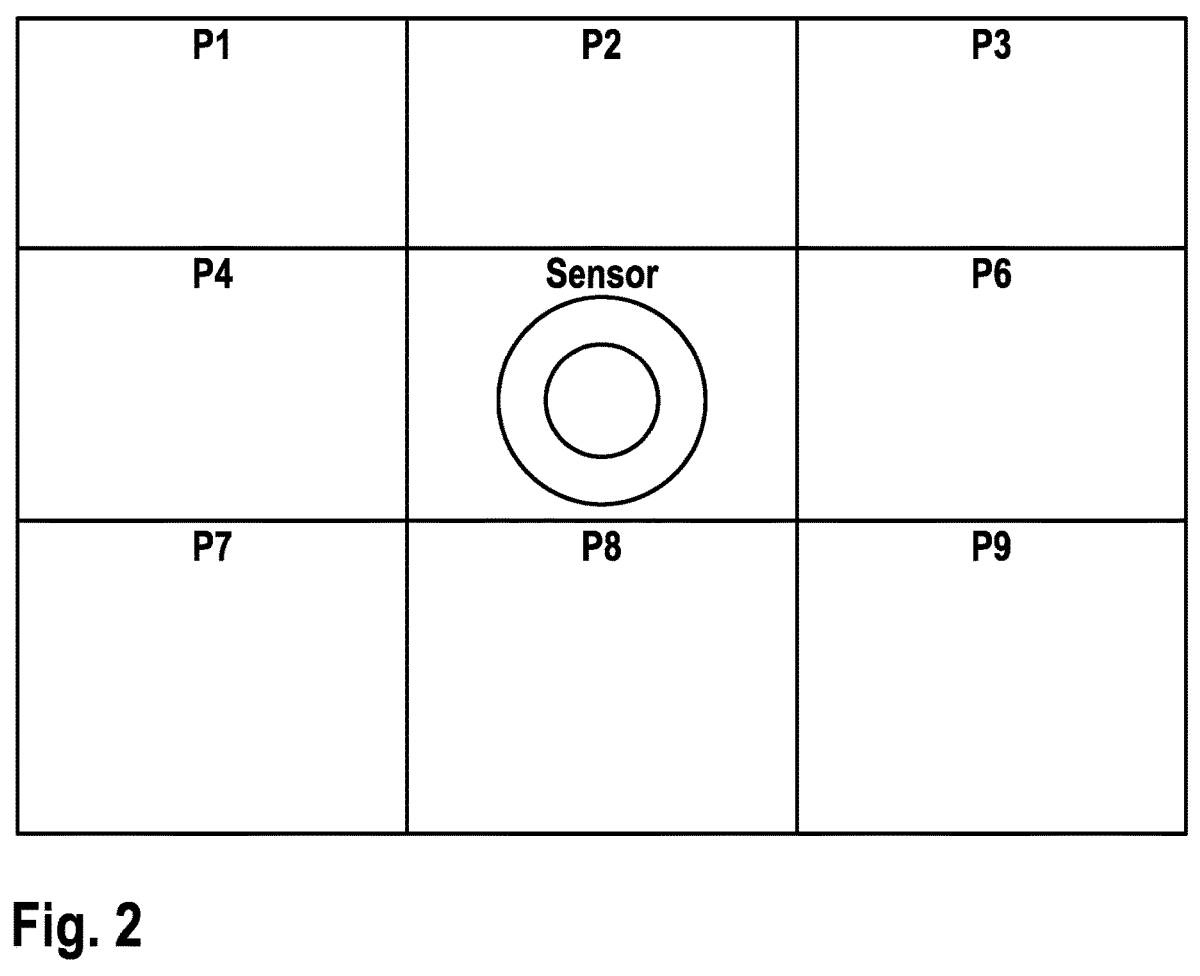

FIG. 2 illustrates an exemplary mapping of detection of the sensor element done dependent on the time of flight, TOF, of the wave and reflection and the amplitude of the reflection. The calculation of the reflection coefficient is done dependent on a multiplication of TOF value and Amplitude value. For a single sensor element, which is not moveable in respect to its detection direction the sensor element can only detect on area, which is illustrated by the circle. If the sensor element is adjustable by its detection direction or in case the sensor system uses multiple sensor elements, more areas, like P1 to P9 exemplary can be detected.

Figure 3:
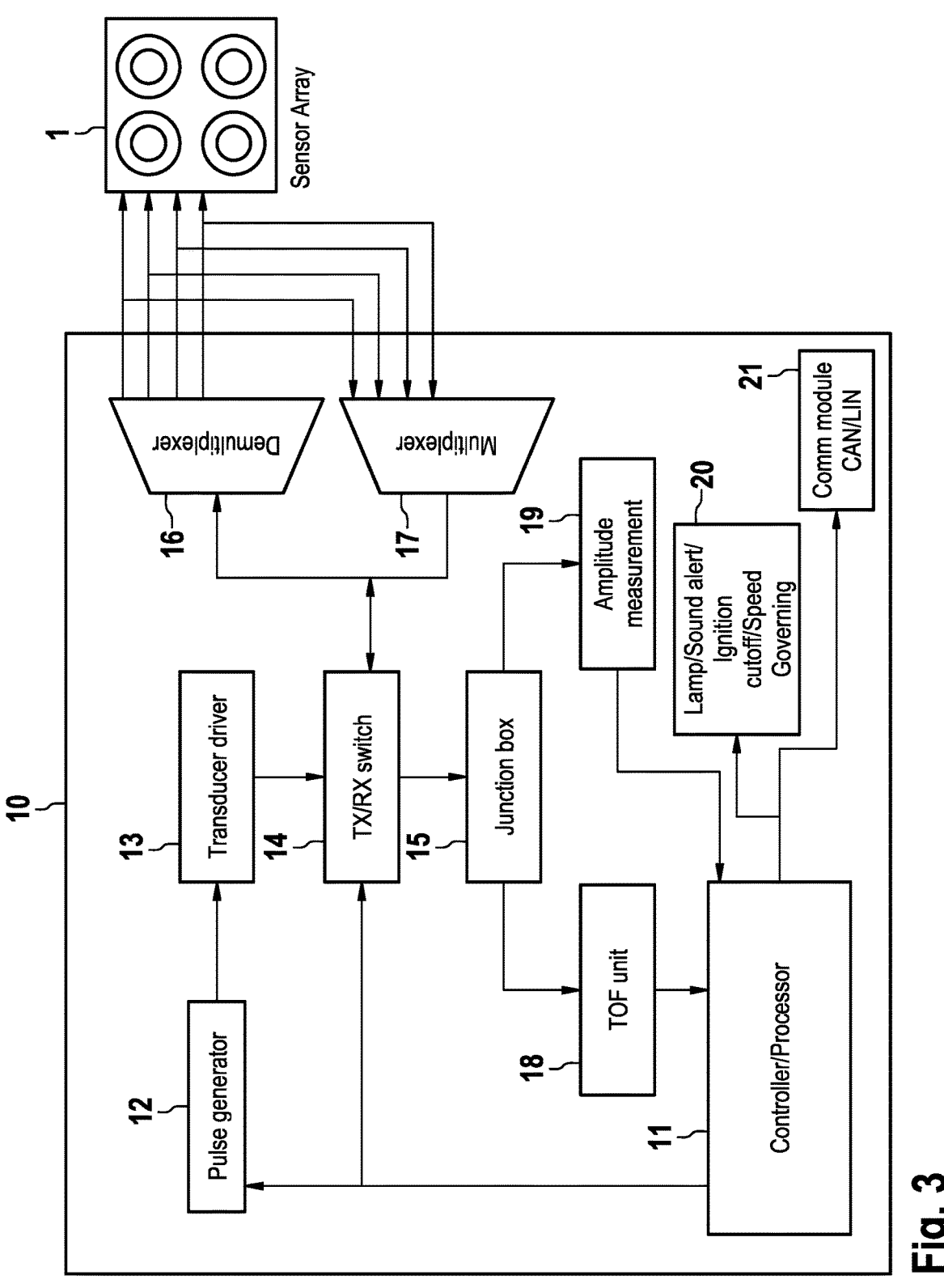

FIG. 3 shows an example of the sensor system. The inputs and outputs of an array of four sensor elements 1 are connected to electronic control unit 10. Within the electronic control unit, the controller 11 is performing the main calculations and the main method. Controller 11 is driving pulse generator 12 to provide a pulse signal, that is used by transducers driver 13 to provide a signal to drive the ultrasonic sensor elements. Transceiver 14 is forwarding that drive signal by demultiplexer 16 to the different sensor elements 1 of the array to emit an ultrasonic wave and to receive the reflected wave each with multiplexer 17. The sensor signal of the reflected wave of a certain sensor element is than forwarded by junction box 15 to a TOF unit 18, which calculates the time of flight and provides that TOF to the controller 11 and in parallel the sensor signal of the reflected wave to an amplitude measurement unit 19, which provides the calculated/measured amplitude also to the controller 11. The controller 11 calculates a reflection coefficient, as a first criterion for the decision, if the driver is wearing a helmet, wherein the reflection coefficient R is calculated dependent on the quotient of the acoustic impedance of the driver's head/face surface and the acoustic impedance of the medium of the transmission environment wherein a helmet is particularly detected, if the unit reflection coefficient R is in the range from 0.93 to 1.5, and if reflection coefficient R if smaller than 0.93 or greater than 1.5, the driver is wearing no helmet as an example for values, which are case by case dependent at least on the distance between the drivers head/face and the sensor element.

Additionally controller 11 calculates a validation parameter, as a second criterion for the decision, if the driver is wearing a helmet, wherein the validation parameter is calculated dependent on the multiplication of the time of flight, TOF, and the amplitude of the sensor signal, wherein the TOP is particularly calculated from the moment of emitting, preferably an ultrasonic wave, until the moment of receiving the reflection signal/reflected ultrasonic wave. In case the validation parameter has a value of a defined range or outside, the controller 11 decides, that the driver is wearing a helmet or not according to the second criterion. In this example, the sensor system comprises an array of sensor element 1, the multiplication of TOF and amplitude is for example a matrix calculation of the TOF matrix, where each sensor has one matrix parameter/value and the amplitude matrix, where each sensor provides one matrix parameter/value.

In total the controller 11 decides, if the driver is wearing a helmet according to the first and second criterion.

Figure 4:
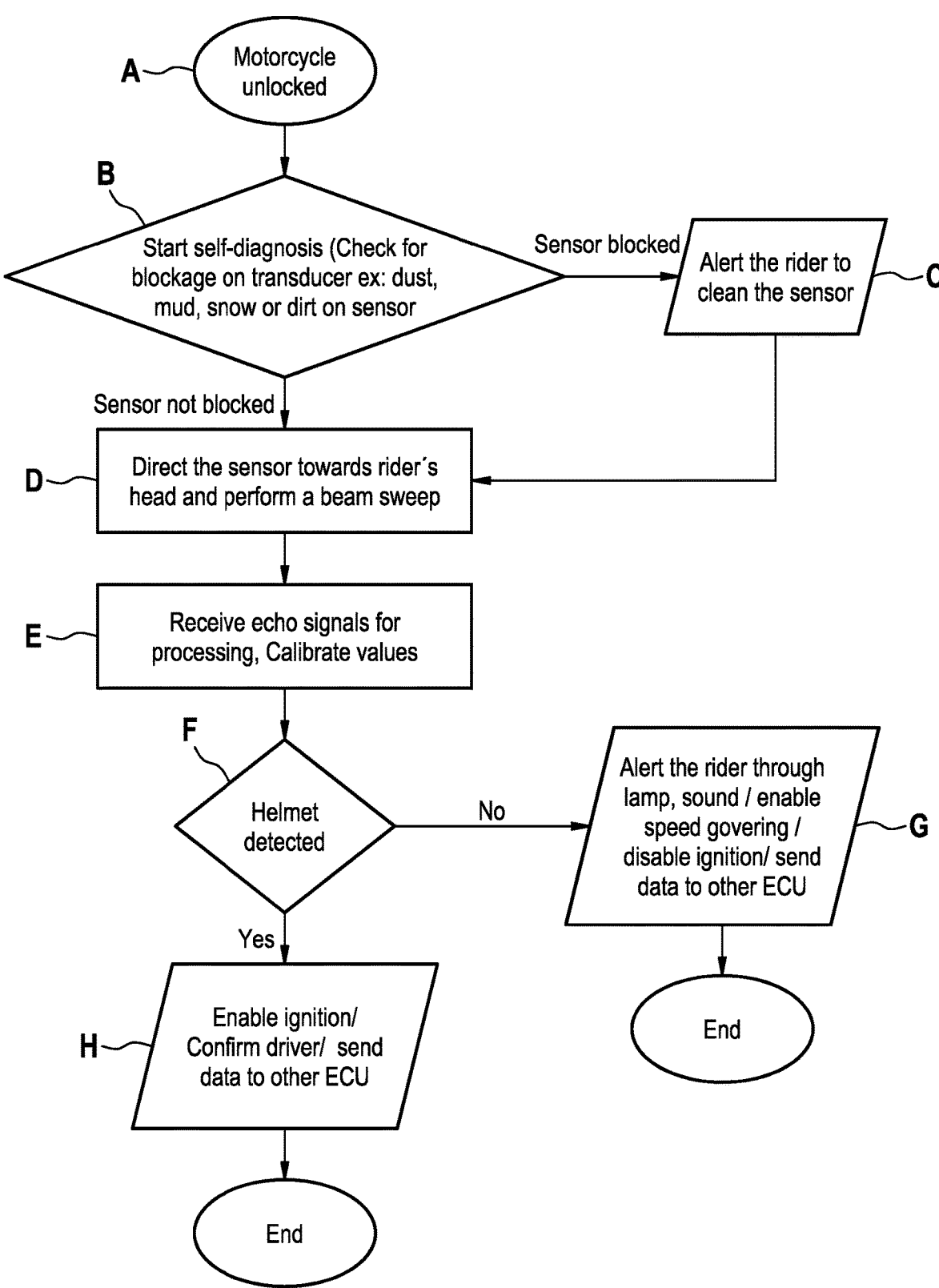

According to FIG. 4 the method is exemplarily illustrated. At first the sensor system is active after the handle lock of the motorcycle is unlocked A. Thereafter a self-diagnosis B is started, that especially checks, if the sensor elements/transducers are blocked by dust, mud, snow or other dirt. If such a contamination/dirt is detected, the driver is warned to clean the sensor elements C.

When the sensor elements are not blocked, the sensor elements are directed towards the driver's head/face, especially if direction is adjustable and a sweep of the sensor element is emitted D, for example a sweep of an ultrasonic wave. The according reflection signal/echo signal is detected E, wherein at first, before the regular measuring and calculation a calibration of the sensor system is performed E.

Dependent of TOF and the measured amplitude and dependent on the quotient of the acoustic impedance of the driver's head/face surface and the acoustic impedance of the medium of the transmission environment the decision is done, if the driver is wearing a helmet/if a helmet is detected F.

If a helmet is detect, the sensor system enables the ignition H and for an example confirms the driver/sends data accordingly to other control units of the vehicle.

In case a helmet was not detected/the decision was made, that the driver is not wearing a helmet, the driver is warned by a warning lamp/warning sound the ignition is for example kept inactive or the vehicle speed is limited G.

The invention claimed is:

1. A sensor system for a single-track vehicle, comprising at least one ultrasonic sensor element positioned for detecting the surface of a driver's head and/or face of that vehicle, an electronic control unit to process the data of the at least one ultrasonic sensor element and to calculate and/or decide, if the driver is wearing a helmet, wherein the electronic control unit is connected to at least one vehicle system, which is controlled by the electronic control unit, wherein the electronic control unit is designed to calculate a reflection coefficient of a sensor signal of the at least one ultrasonic sensor element to decide, as a first criterion, if the driver is wearing a helmet, wherein the reflection coefficient is calculated dependent on a quotient of an acoustic impedance of the driver's head and/or face surface and an acoustic impedance of a medium of a transmission environment, and wherein the electronic control unit is designed to provide, if the electronic control unit decides that the driver is not wearing a helmet, at least one of: at least one of a control or actuation to disable the ignition of the vehicle, as a vehicle system; at least one of an acoustic or visual warning to the driver; or a limiting of the speed of the vehicle.

2. The sensor system according to claim 1, wherein the at least one ultrasonic sensor element is placed at or on or beside an instrument cluster.

3. The sensor system according to claim 1, wherein the electronic control unit is designed to calculate a reflection coefficient R, as the first criterion, according to or dependent on the following equation $$R = ((Z_2 - Z_1)/(Z_2 + Z_1))^2,$$

wherein $Z_1$ is the acoustic impedance of the medium of the transmission environment and $Z_2$ is the acoustic impedance of the driver's head/face surface.

4. The sensor system according to claim 1, wherein the at least one ultrasonic sensor element is mounted in the way, that a direction of detection of the at least one ultrasonic sensor element can be changed by moving the at least one ultrasonic sensor element with regard to its sensitive direction.

5. The sensor system according to claim 4, wherein the at least one ultrasonic sensor element is laterally fixed, but moveable with regard to its detection direction and/or angle of direction controlled by the electronic control unit.

6. A method for detecting a helmet of a driver of a single-track vehicle, using a sensor system for the single-track vehicle comprising at least one ultrasonic sensor element positioned for detecting the surface of a driver's head and/or face of that vehicle, an electronic control unit to process the data of the at least one ultrasonic sensor element and to calculate and/or decide, if the driver is wearing a helmet, wherein the electronic control unit is connected to at least one vehicle system, which is controlled by the electronic control unit, wherein the electronic control unit is designed to calculate a reflection coefficient of a sensor signal of the at least one ultrasonic sensor element to decide, as a first criterion, if the driver is wearing a helmet, wherein the reflection coefficient is calculated dependent on a quotient of an acoustic impedance of the driver's head and/or face surface and an acoustic impedance of a medium of a transmission environment, wherein after at least one of a steering lock of the vehicle is unlocked or the ignition is activated, the at least one ultrasonic sensor element detects the surface of at least one of the driver's head or face, wherein the electronic control unit afterwards processes the data of the at least one ultrasonic sensor element and decides, if the driver is wearing a helmet, wherein if the driver is wearing no helmet, at least one of i) the ignition will be disabled, ii) the ignition will not be enabled, iii) an acoustic warning will be provided to the driver, and iv) a visual warning will be provided to the driver.

7. The method according to claim 6, wherein the at least one ultrasonic sensor element performs a beam sweep of ultrasonic pulses, controlled by the electronic control unit, towards the driver's head or face, wherein the echo of these ultrasonic pulses is received by the at least one ultrasonic sensor element and the at least one ultrasonic sensor element provides the data to the electronic control unit.

8. The method according to claim 6, wherein the electronic control unit uses amplitude detection to detect with the at least one ultrasonic sensor element, if the driver is wearing a helmet.

9. The method according to claim 6, wherein the electronic control unit uses frequency analysis of the data of the at least one ultrasonic sensor element, to decide, if a helmet is detected.

10. The method according to claim 6, wherein the electronic control unit performs a self-diagnosis of the sensor system before calculation and/or deciding if the driver is wearing a helmet.

11. The method according to claim 10, wherein the electronic control unit performs a calibration after the self-diagnosis of the sensor system and before the calculation and/or deciding if the driver is wearing a helmet.

12. The method according to claim 6, wherein the electronic control unit calculates a validation parameter, as a second criterion for the decision, if the driver is wearing a helmet, wherein the validation parameter is calculated dependent on the multiplication of the time of flight TOF and the amplitude of the sensor signal.

13. The sensor system according to claim 4, wherein the at least one ultrasonic sensor element is laterally fixed, but moveable with regard to its detection direction and/or angle of detection by an electric motor controlled by the electronic control unit.

14. The method according to claim 6, wherein the method of detecting, if the driver is wearing a helmet is continuous or repeated after a defined time interval, as long as the ignition of the vehicle is active.

* * * * *